US007779678B2

(12) United States Patent
Wolber et al.

(10) Patent No.: US 7,779,678 B2
(45) Date of Patent: Aug. 24, 2010

(54) METHOD AND DEVICE FOR MONITORING A FUEL INJECTION DEVICE FOR AN INTERNAL COMBUSTION ENGINE

(75) Inventors: Jens Wolber, Gerlingen (DE); Oliver Wiemers, Stuttgart (DE); Winfried Langer, Illingen (DE); Andreas Baumann, Vaihingen/Enz (DE); Christian Koehler, Erligheim (DE); Norbert Mueller, Farmington Hills, MI (US); Hans-Juergen Baehr, Ebersbach (DE); Matthias Walz, Vaihingen/Enz (DE)

(73) Assignee: Robert Bosch GmbH, Stuttgart (DE)

( * ) Notice: Subject to any disclaimer, the term of this patent is extended or adjusted under 35 U.S.C. 154(b) by 213 days.

(21) Appl. No.: 10/593,224

(22) PCT Filed: Feb. 16, 2006

(86) PCT No.: PCT/EP2006/060032

§ 371 (c)(1),
(2), (4) Date: Sep. 18, 2006

(87) PCT Pub. No.: WO2006/089858

PCT Pub. Date: Aug. 31, 2006

(65) Prior Publication Data

US 2008/0249699 A1 Oct. 9, 2008

(30) Foreign Application Priority Data

Feb. 23, 2005 (DE) ...................... 10 2005 008 180

(51) Int. Cl.
*G01M 15/11* (2006.01)

(52) U.S. Cl. .................................................. 73/114.45

(58) Field of Classification Search .............. 73/114.02, 73/114.38, 114.45, 114.48, 114.49
See application file for complete search history.

(56) References Cited

U.S. PATENT DOCUMENTS

| | | | | |
|---|---|---|---|---|
| 4,841,765 | A * | 6/1989 | Blanke | 73/114.45 |
| 5,263,365 | A | 11/1993 | Muleer et al. | |
| 6,474,292 | B1 | 11/2002 | Frenz et al. | |
| 7,243,532 | B2 * | 7/2007 | Tsujimura et al. | 73/114.02 |
| 2003/0110845 | A1 * | 6/2003 | Kumagai et al. | 73/116 |
| 2005/0120786 | A1 * | 6/2005 | Tsujimura et al. | 73/119 R |
| 2006/0116810 | A1 | 6/2006 | Joos et al. | |

FOREIGN PATENT DOCUMENTS

| | | |
|---|---|---|
| DE | 199 08 352 | 8/2000 |
| DE | 103 05 178 | 8/2004 |
| EP | 0 785 358 | 7/1997 |
| JP | 08021289 | 1/1996 |

* cited by examiner

*Primary Examiner*—Eric S McCall
(74) *Attorney, Agent, or Firm*—Michael J. Striker

(57) ABSTRACT

In a method and a device for operating an injection device (5) for an internal combustion engine, the injection device (5) includes injection valves (40), via which fuel is injected directly into combustion chambers (100) of the internal combustion engine. Mechanisms are provided for detecting misfirings (310), and for determining a fuel pressure (320). A mechanical fault of an injection valve (40) is detected when a misfire occurs in a cylinder (110) and the fuel pressure simultaneously drops below a threshold value (SW). An electrical fault in an injection device (5) is detected when misfirings of cylinders (110) assigned to an output stage bank of the injection device (5) are observed, and the fuel pressure has dropped below a threshold value (SW). The responses to the faults that are implemented differ depending on the faults that were detected.

4 Claims, 3 Drawing Sheets

METHOD AND DEVICE FOR MONITORING A FUEL INJECTION DEVICE FOR AN INTERNAL COMBUSTION ENGINE

The present invention relates to a method for operating an injection device for an internal combustion engine. The present invention also relates to a device and a computer program for carrying out the inventive method.

BACKGROUND OF THE INVENTION

Fuel injectors for a high-pressure and a low-pressure fuel direct injection device are basically known in the related art. In particular, fuel injectors are also known, with which the dosing of the fuel quantity to be injected into the combustion chambers of the internal combustion engine can be carried out for as long as the valve is open, but also by varying the stroke of the nozzle needle of the fuel injector. The fuel injectors are typically designed as solenoid valves or piezo valves.

Fuel injectors meter the fuel mass required for clean, efficient combustion in the engine and which is to be injected into the cylinder. The control of the fuel injectors typically takes place via a powerstage, the injection preferably being triggered via a low-side switch of the output stage.

The output stage is monitored during operation, so that short-circuits to battery voltage and to the ground of the output stage are detected, and so they can be responded to.

It is further known to also monitor software and hardware faults, e.g., in an electronic control unit.

Publication DE 103 05 178 A1 makes known a method for operating a fuel injector of an internal combustion engine, with which dirty fuel injectors are detected by monitoring the internal combustion engine for proper functioning, and with which suitable cleaning measures are implemented. To monitor proper functioning, the pressure in a fuel accumulator is monitored, and the cylinders are monitored for misfirings. The torque behavior is also monitored and, by specifically enriching and simultaneously monitoring the lambda value, a check is carried out to determine whether the fuel injectors are functioning properly. If contamination is detected, measures are implemented to clean the fuel injector.

SUMMARY OF THE INVENTION

In contrast, the inventive method for operating an injection device has the advantage that, by evaluating signals of a misfire detection, at least two malfunctions of an injection device are detected, so that suitable responses can be advantageously implemented, depending on the malfunction that was detected. This has the particular advantage that, when an electrical fault occurs in the injection device, for example, no attempts will be made to clean a fuel injector.

Furthermore, advantageously, a monitoring device of an injection device (5) of an internal combustion engine is provided, with which a detection means detects signals of a misfire detection, the monitoring device detecting at least two malfunctions of the injection device by evaluating the signals of the misfire detection, and the monitoring device implementing a response depending to the malfunction that was detected.

Due to the measures listed in the subclaims, advantageous refinements and improvements of the method described in the independent claim are made possible.

In particular, it is provided that fuel pressure is evaluated to check whether the injection device has malfunctioned. It is therefore advantageously ensured that responses to faults are implemented only when an additional evaluation that is independent of the misfire detection also detects a malfunction of the injection device. The reliability of the fault detection is thereby advantageously increased.

According to the present invention, it is provided that, when a misfiring cylinder is detected and the fuel pressure has dropped below a threshold value, a mechanical malfunction of the injection device is detected. This advantageously ensures that only those responses to faults can be implemented that are suitable for eliminating mechanical faults.

A further embodiment provides that, if cylinders assigned to an output stage bank of the injection device misfire, and the fuel pressure has dropped below a threshold value, an electrical malfunction of the injection device is detected. The advantage of this is that measures can be specifically implemented that are suitable for eliminating electrical faults in the injection device.

It is also advantageous that, when an electrical fault is detected, an output stage (45) that controls the fuel injectors (40) is also checked for electrical faults. This makes it possible, in an advantageous manner, to further localize the cause of the electrical malfunction and to implement specific responses to the fault.

It is advantageous, in particular, that, depending on the malfunction, the internal combustion engine is operated in a limp-home mode in response to the fault.

It is also advantageous to depict this inventive procedure in a method and a computer program product.

BRIEF DESCRIPTION OF THE DRAWINGS

Further features, possible applications, and advantages of the present invention result from the description of exemplary embodiments of the present invention, below, the exemplary embodiments being depicted in the drawing.

DETAILED DESCRIPTION OF THE EXEMPLARY EMBODIMENTS

The present invention is based on the approach of checking the mechanical and electrical function an injection device of an internal combustion engine and, if the injection device has malfunctioned, implementing fault-specific responses and help measures.

Independently of the designs depicted in the exemplary embodiments, the present invention is suited for use for low-pressure and high-pressure fuel injection systems.

Figure 1:
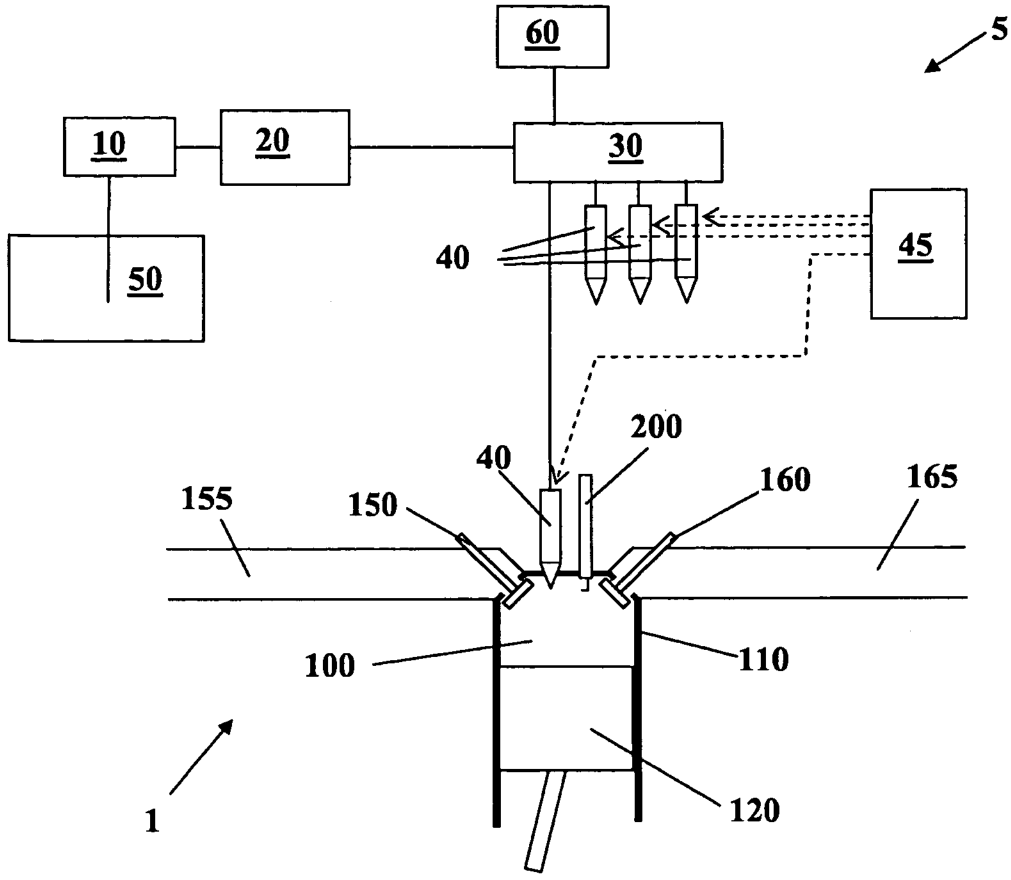
FIG. 1 shows a schematic illustration of an internal combustion engine with an injection device.

FIG. 1 is a schematic illustration of a multiple-cylinder internal combustion engine 1 with an injection device 5. Four fuel injectors 40 and one of the cylinders 110 are shown, as an example. Injection device 5 includes a first and second fuel pump 10, 20, a pressure accumulator 30, fuel injectors 40, an output stage 45, a fuel tank 50, and a pressure sensor 60. First fuel pump 10 pumps fuel out of a fuel tank 50 in the direction of a second fuel pump 20. First fuel pump 10 is suitable for generating a low pressure. Second fuel pump 20 pumps the fuel into pressure accumulator 30 and increases the low pressure provided by first fuel pump 10 to a high pressure. Pressure accumulator 30 is often referred to as a fuel accumulator, a rail or a common rail, and is connected with four fuel injectors 40. At the least, the pressure in pressure accumulator 30 is monitored using a pressure sensor 60.

As an example, one of the four fuel injectors 40 is shown connected with a cylinder 110 of internal combustion engine 1. A piston 120 is movably located in cylinder 110. The cylinder includes a combustion chamber 100, which is limited by piston 120, an intake valve 150, and exhaust valve 160, among other things. Several intake and/or exhaust valves 150, 160 can also be provided. In the region of intake and exhaust valves 150, 160, a fuel injector 40 and a spark plug 200 extend into combustion chamber 100. Fuel injectors 40 make it possible to inject fuel directly into combustion chamber 100; they are controlled by output stage 45. The fuel in combustion chamber 100 can be ignited using spark plug 200. Furthermore, an intake manifold 155 preferably directs air toward intake valve 150. When intake valve 150 opens, the air enters combustion chamber 110. When exhaust valve 160 opens, exhaust gases, preferably, are directed further into an exhaust manifold 165.

Figure 2:
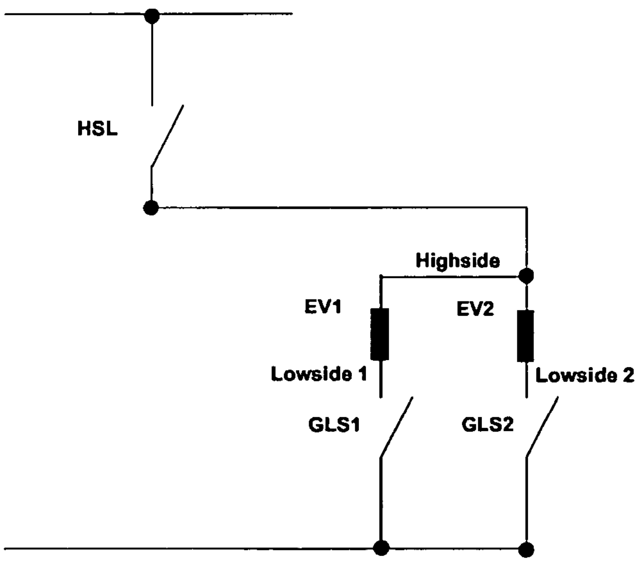
FIG. 2 shows a schematic illustration of an output stage circuit for two fuel injectors.

FIG. 2 shows, as part of an output stage 45, a schematic illustration of an output stage bank for two fuel injectors EV1, 2 as actuators, which are depicted symbolically in this example as resistors. Of course, capacitive or inductive actuators can also be provided, which are designed, e.g., as piezo valves or solenoid valves.

Each of the actuators EV1, 2 is connected with a supply line using one connection each on the high side via a high side switching element HSL. On the other connection side of actuators EVL 2, i.e., the low side, the connection of first actuator EV1 is connected with a first low side switching element GLS1, and the connection of second actuator EV2 is connected with a second low side switching element GLS2. Both switching elements GLS1, GLS2 switch the two actuators EV1, 2 to a common low side supply line.

Figure 3:
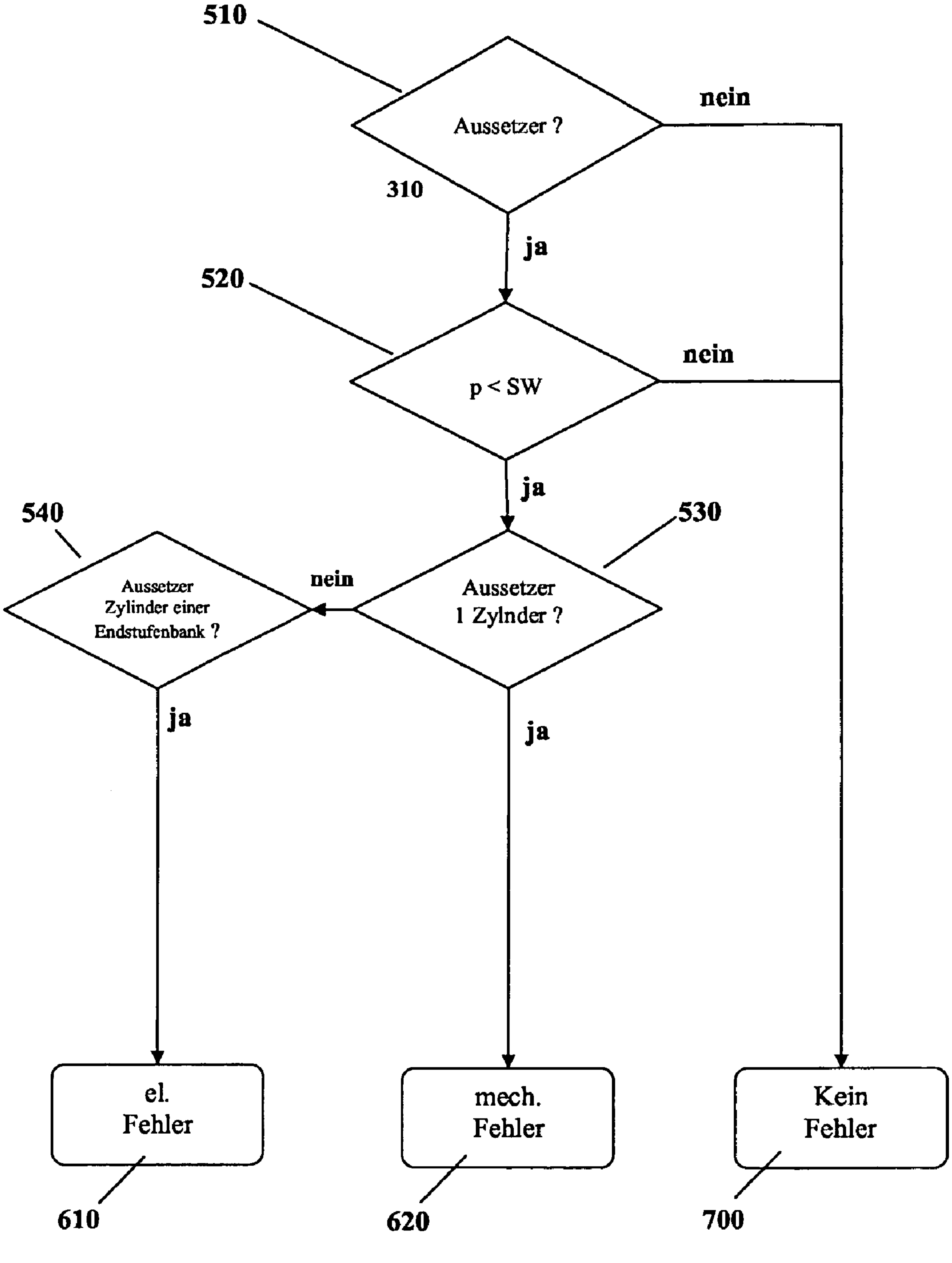
FIG. 3 shows a flow chart of a method according to the present invention.

FIG. 3 shows a flow chart of a method according to the present invention.

In a first step 510, a check is carried out to determine whether misfires were detected. If no misfires were detected, it can be assumed that none of the fuel injectors is continually open, and the check is ended in step "No Fault" 700.

If misfires were detected, a check is carried out in second step 520 to determine whether fuel pressure p has dropped below a threshold value. If the fuel pressure is above the threshold value, it can be assumed that, despite the misfiring, none of the fuel injectors is continually open, and the further check is ended in step "No Fault" 700.

If the threshold value has been fallen below, a check is carried out in a third and fourth step 530, 540 to determine whether misfires occur only in one cylinder or in all cylinders of an output stage bank.

If misfires occur in only one cylinder, it can be assumed that the fuel injector of the particular cylinder is continually open due to a mechanical malfunction. The process branches off to step "Mechanical fault" 620.

If misfires are observed in all cylinders assigned to an output stage bank, it can be assumed that the fuel injectors in this cylinder bank are continually open due to an electrical malfunction. The process branches off to step "Electrical fault" 610.

In further, not-shown method steps, suitable responses to the faults can be implemented depending on the malfunctions that were detected.

The present invention is based on the idea that, if a fuel injector 40 is continually open, a very large quantity of fuel from fuel accumulator 30 is injected into a combustion chamber of a cylinder of the internal combustion engine. This has the following effects:

As a result of the fuel mass flowing through a continually open fuel injector, the fuel pump is no longer capable of holding the pressure in the pressure accumulator constant. The fuel pressure in the fuel accumulator drops. A threshold value—below which the fuel pressure typically falls when a fuel injector is continually open—for the fuel pressure can now be specified for a given system. If a threshold value of this type is fallen below, this can therefore be assessed as a fault feature of a continually-open fuel injector.

Furthermore, due to the excessive amount of fuel mass injected, a combustible mixture is no longer produced in the particular cylinder, combustion does not occur, and "misfirings" occur. These misfirings are detected by a misfire detection. Misfires are therefore a feature that occurs when a fuel injector is continually open.

If misfirings and a pressure drop are observed, it can be assumed that the fuel injector is continually open. A further distinction can be made, namely whether a mechanical or electrical fault has occurred in the injection device.

If a mechanical malfunction has occurred in the injection device, i.e., when the nozzle needle becomes stuck, e.g. because it is dirty, fuel is injected continually into this cylinder, while the remaining cylinders function normally. Misfirings are therefore observed only for this cylinder.

If there is an electrical malfunction in an injection device, e.g., due to a faulty control signal from the output stage, this results in misfirings in all cylinders assigned to the faulty output stage bank. In the case of a four-cylinder internal combustion engine, therefore, two cylinders typically misfire. If the first actuator or fuel injector actuator 1 shown in FIG. 2 has a short-circuit to ground on the low side, for example, first fuel injector actuator 1 is continually open. Since all of the current flows through first fuel injector actuator 1, however, no current is available for second fuel injector actuator 2 to open the valve, and the second fuel injector remains closed. Misfires therefore occur in one cylinder due to an excessive quantity of fuel, and in the other cylinder due to a shortage of fuel.

Simply by evaluating the misfire detection signals, it is therefore possible to detect electrical or mechanical malfunctions of the injection device. When the fuel pressure is evaluated, a check is carried out to determine whether the misfires of the internal combustion engine are caused by a malfunction of the injection device or if they have another cause.

Suitable responses to the fault can now be implemented, depending on the malfunction that was determined. If a mechanical malfunction has occurred, for example, the fuel injector can be controlled specifically in an attempt to rinse the fuel injector with fuel, or to loosen it mechanically.

If an electrical malfunction is detected, it can be provided, e.g., in further testing steps, to further localize the electrical fault, and to take further safeguards, depending on the type of electrical fault.

It can be provided, in particular, that, when a fault is detected, appropriate emergency measures are implemented, e.g., by changing operating modes of the internal combustion engine or adapting fuel injection parameters. As an emergency measure, it can be provided, e.g., that the faulty output stage bank is switched off if an electrical fault is detected. Further emergency measures are also feasible, however.

Figure 4:
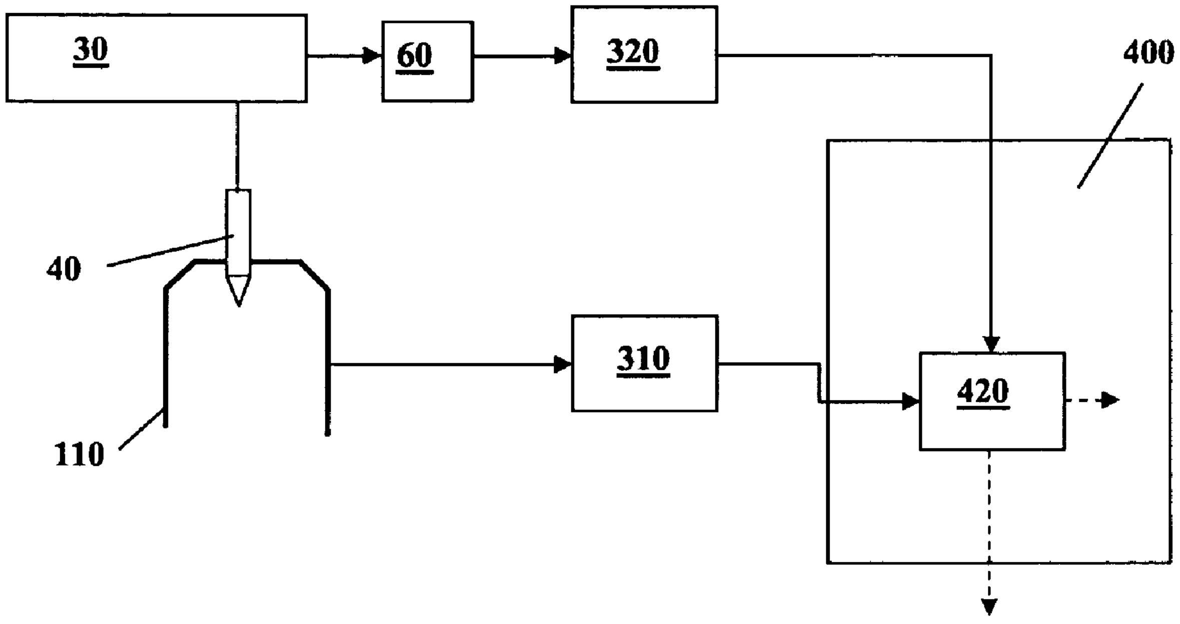
FIG. 4 is a schematic illustration of the device according to the present invention.

FIG. 4 shows an exemplary embodiment of an inventive monitoring device 400 of an injection device 5. In the example shown, detection means 420 are part of inventive device 400. A fuel accumulator 30 that is connected with a fuel injector 40 is shown schematically. Fuel injector 40 extends into a cylinder 110 of the internal combustion engine. A fuel pressure p in fuel accumulator 30 is detected via pressure detection 320 using a pressure sensor 60. Furthermore, a misfire detection 310 is connected with cylinder 110. Signals from pressure detection 320 and misfire detection 310 are forwarded to detection means 420. Monitoring device 400 evaluates the detected signals and implements suitable responses depending on the malfunction that was detected.

In a further embodiment it can be provided that inventive monitoring device 400 is designed as part of an engine control unit. In particular, pressure detection 320 and misfire detection 310 can also be part of an engine control unit. Further combinations are also feasible, of course.

What is claimed is:

1. A method for monitoring an injection device for an internal combustion engine, comprising the following steps:

monitoring by a misfire detection of a cylinder of the internal combustion engine for misfiring;

detecting at least one of a mechanical malfunction and an electrical malfunction of an injection device by evaluating signals of the misfire detection;

detecting different types of errors based on a number of cylinders in which a misfire has occurred;

implementing as a response one of a check for electrical faults of an output stage and a limp-home mode depending on the malfunction that was detected;

detecting a mechanical malfunction of the injection device when a misfiring cylinder is detected and the fuel pressure has dropped below a threshold value; and detecting an electrical malfunction of the injection device if cylinders (110) assigned to an output stage of the injection device (5) misfire, and the fuel pressure drops below a threshold value (SW).

2. The method as recited in claim 1, wherein, by evaluating a fuel pressure, a check is carried out to determine whether there is a malfunction of the injection device.

3. A computer program product with program code that is stored on a machine-readable data storage device for carrying out the method as recited in claim 1 when the program is run on a computer or in an electronic control unit.

4. A monitoring device of an injection device of an internal combustion engine, comprising:

detection means configured to detect signals of a misfire detection, wherein the misfire detection is configured to monitor a cylinder of the internal combustion engine for misfiring, wherein the monitoring device is adapted to detect at least one of a mechanical malfunction and an electrical malfunction of the injection device by evaluating the signals of the misfire detection and to detect different types of errors based on a number of cylinders in which a misfire has occurred, and wherein the monitoring device is further adapted to implement as a response one of a check for electrical faults of an output stage and a limp-home mode depending to the malfunction that was detected.

* * * * *